United States Patent
Gupta

(10) Patent No.: US 6,606,382 B2
(45) Date of Patent: *Aug. 12, 2003

(54) SYSTEM AND METHOD FOR IMPLEMENTATION OF AN ECHO CANCELLER

(75) Inventor: Samir K. Gupta, San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,933

(22) Filed: Jan. 27, 2000

(65) Prior Publication Data

US 2003/0072439 A1 Apr. 17, 2003

(51) Int. Cl.$^7$ .................................................. H04M 1/00
(52) U.S. Cl. ............................. 379/406.05; 379/406.07
(58) Field of Search ........................ 379/388.02, 390.02, 379/392, 392.01, 406.01, 406.05, 406.06, 406.07, 406.08, 406.16; 455/562

(56) References Cited

U.S. PATENT DOCUMENTS 4,697,261 A    9/1987   Wang et al. ................. 370/32.1

(List continued on next page.)

FOREIGN PATENT DOCUMENTS

WO      98/30009     7/1998
WO      99/35814     7/1999

OTHER PUBLICATIONS

Messerschmitt, David G. "Echo Cancellation in Speech and Data Transmission" IEEE J. on Selected Areas in Communications SAC–2(2): 283–297 (1984).

(List continued on next page.)

Primary Examiner—Forester W. Isen
Assistant Examiner—Jefferey Harold
(74) Attorney, Agent, or Firm—Philip Wadsworth; Kent Baker; Sandra L. Godsey

(57) ABSTRACT

A system and method for canceling an echo signal. An input waveform is provided to an acoustic processor, and a determination is made whether the input waveform includes information representative of an echo signal. If the input waveform includes information representative of an echo signal, an output waveform is formed by attenuating a residual waveform with the acoustic processor. The residual waveform is attenuated by an attenuation factor that gradually changes from an initial attenuation value to a final attenuation value during the attenuation step.

A system and method for adjusting an acoustic signal from a muted state to an unmuted state by varying an attenuation factor applied to an acoustic signal by an acoustic processor. The acoustic signal is provided to an acoustic processor. An output waveform is formed from the acoustic processor by adjusting the attenuation factor from a muted state to a first attenuation value associated with the non-muted state. After the attenuation factor is adjusted to the first attenuation value, the output waveform is formed by gradually changing the attenuation factor from the first attenuation value to a second attenuation value. The input waveform is attenuated by a smaller amount when the second attenuation value is applied to the acoustic signal than when the first attenuation value is applied to the acoustic signal.

18 Claims, 6 Drawing Sheets

U.S. PATENT DOCUMENTS

| | | | | |
|---|---|---|---|---|
| 4,764,955 | A | | 8/1988 | Galand et al. ............... 379/411 |
| 4,782,525 | A | | 11/1988 | Sylvain et al. ............... 379/410 |
| 4,901,307 | A | * | 2/1990 | Gilhousen et al. .......... 455/562 |
| 5,307,405 | A | | 4/1994 | Sih ............................. 379/410 |
| 5,396,488 | A | * | 3/1995 | Lahdemaki ............ 379/406.08 |
| 5,646,991 | A | | 7/1997 | Sih ............................. 379/410 |
| 5,852,661 | A | * | 12/1998 | Chen .................... 379/406.01 |

OTHER PUBLICATIONS

Minami, et al. "A Double Talk Detection Method For an Echo Canceller" IEEE: pp. 1492–1497 (1985).

Montagna, et al. "A Fast Adaptive Echo Canceller with Delay Estimation for Time Variant Telephone Circuits" IEEE: pp. 1569–1574 (1984).

Sondhi, et al. "Silencing Echoes on the Telephone Network" Proceedings of the IEEE 68(8): 948–963 (1980).

* cited by examiner

SYSTEM AND METHOD FOR IMPLEMENTATION OF AN ECHO CANCELLER

BACKGROUND OF THE INVENTION

I. Field of the Invention

The present invention relates generally to echo cancellers. More particularly, the present invention relates to a novel and improved system and method for reducing the chopiness heard in full-duplex systems that use echo cancellers. The teachings of the present invention apply to acoustic echo cancellers, as well as to echo cancellers in networks and other non-acoustic systems.

II. Description of the Related Art

Acoustic echo-cancellers (AEC) are used in teleconferencing and hands-free telephony applications to eliminate acoustic feedback between a loudspeaker and a microphone. In a cellular telephone system where the driver uses a hands-free telephone, acoustic echo cancellers are used in the mobile station to provide full-duplex communications. A block diagram of a traditional acoustic echo canceller is illustrated in FIG. 1.

For reference purposes, the driver is the near-end talker with input speech signal v(n) and the person at the other end of the connection is the far-end talker with input digital speech signal x(n). The speech of the far-end talker is broadcast out of loudspeaker 2 in the mobile telephone. If this speech is picked up by microphone 10, the far-end talker hears an annoying echo of his or her own voice. The output of microphone 10, r(n), is a digital signal. Typically the functions performed by microphone 10 may be accomplished by a microphone, which would convert the audio signal to an analog electrical signal and an analog to digital (A/D) converter. The AEC identifies the impulse response between speaker 2 and microphone 10, generates a replica of the echo using adaptive filter 14, and subtracts it in summer 12 from the microphone output, r(n), to cancel the far-end talker echo y(n). Since the adaptive filter cannot generally remove all of the echo, some form of echo suppression provided by residual echo suppression element 18 (e.g., a non-linear post processor) is typically employed to remove any residual echo.

In FIG. 1, the far end talker echo signal y(n) is illustrated as the output of an acoustic echo path element 4, which is an artifact of the proximity of the loud speaker 2 and microphone 10. To the far end talker echo signal y(n) is added noise signal w(n) and near-end speech signal v(n), illustrated by summing elements 6 and 8 respectively. It should be noted that summing elements 6 and 8 an d acoustic echo path 4 are artifacts of the mobile environment and are presented for illustrative purposes.

Adaptive filter 14 uses the far-end speech x(n) as a reference signal. If adaptive filter 14 is allowed to adapt in the presence of v(n), the near-end speech will be added to the error signal e(n), which drive s the filter tap coefficient adaptation, corrupting the estimate of acoustic echo path 4. It is therefore necessary to disable coefficient adaptation when both talkers are speaking, a condition referred to as doubletalk. During doubletalk, residual echo suppression element 18 must also be disabled to prevent corruption of the near-end speech. A doubletalk detector (not shown) typically detects the presence of doubletalk and provides control signals to disable adaptive filter 14 and residual echo suppression element 18 when doubletalk is present.

As shown in FIG. 2, in prior art echo cancellation systems, residual echo supression element 18 functions to cancel any residual echo by muting (i.e., gating-off) its output whenever an echo is detected by the adaptive filter 14. This aspect of element 18 is shown in portion "A" of FIG. 2. The upper half of portion "A" of FIG. 2 illustrates the detection of an echo condition resulting from acoustic feedback between loudspeaker 2 and a microphone 10 when the word "HELLO" is spoken by a far-end talker. The lower half of portion "A" of FIG. 2 shows that, as soon as the echo is detected at $t_1$, the output of element 18 is muted-off entirely. Thereafter, as soon as the echo ceases to be present at $t_2$, the output of element 18 is unmuted.

In addition, in instances where the output of residual echo supression element 18 is muted because adaptive filter 14 has detected an echo and the double-talk detector simultaneously detects double-talk, residual echo supression element 18 will unmute its output during the double-talk period. This aspect of element 18 is shown in portion "B" of FIG. 2. The upper half of portion "B" of FIG. 2 illustrates the detection of a double-talk condition at $t_4$ at a time when the output of element 18 is being muted as a result of the detection of an echo condition between $t_3$ and $t_4$. The double-talk condition results from simultaneous speech by the far-end and near-end talkers (i.e, the near-end talker is saying "HI" during the time that the far-end talker is saying "HELLO"). The lower half of portion "B" of FIG. 2 shows that, as soon as the double-talk is detected at $t_4$, the output of element 18 is unmuted. Thereafter, as soon as the double-talk condition ceases to be present at $t_5$, the output of element 18 is muted again. The output of element 18 remains fully muted until the echo resulting from the word "HELLO" spoken by the far end talker ceases at $t_6$. Aas soon as the echo ceases to be present at $t_6$, the output of element 18 is unmuted.

Portion "C" of FIG. 2 similarly illustrates an example where the output of element 18 remains unmuted when a double-talk condition is detected between, $t_7$ and $t_8$. Thereafter, as soon as the double-talk condition ceases to be present at $t_8$, the output of element 18 is muted again because of an ongoing echo condition. The output of element 18 remains fully muted until this echo condition ceases at $t_9$, thereby causing muting of the word "UP" from the near-end talker between $t_8$ and $t_9$. As soon as the echo ceases to be present at $t_9$, the output of element 18 is unmuted.

Referring still to the prior art system of FIG. 1, when the echo component y(n) dominates the near-end speech signal v(n) during particular periods, the near-end speech will be muted out by element 18. This situation can result in an undesireable chopiness in the audible signal heard by the user. One purpose of the present invention is smooth this chopiness, which can be unpleasant and annoying to the user.

In addition to be annoying to the user, this chopiness often results in the presentation of an unsmooth energy curve to the vocoder used for encoding the near-end speech signal. In applications where variable rate vocoders are used, the chopiness in the energy curve can cause the vocoder to transmit at the full data rate more often than is necessary, thereby wasting limited system capacity. Thus, it is a further object of the present invention to present a smoother energy curve to the vocoder, thereby improving its performance.

These problems and deficiencies are recognized and solved by the present invention in the manner described below.

SUMMARY OF THE INVENTION

One aspect of the present invention is directed to a system and method for canceling an echo signal. This aspect of the invention may be used, for example, for removing an abrupt transition in the audible signal that would otherwise occur when the near-end speech signal is dominated by an echo and the output of the non-linear post-processor is being changed from a non-muted to a muted state. According to this aspect of the invention, an input waveform is provided to an acoustic processor, and a determination is made whether the input waveform includes information representative of an echo signal. If the input waveform includes information representative of an echo signal, an output waveform is formed by attenuating a residual waveform with the acoustic processor. The residual waveform is attenuated by an attenuation factor that gradually changes from an initial attenuation value to a final attenuation value during the attenuation step. This aspect of the invention may also be used, for example, for removing the chopiness in the audible signal that would otherwise occur when the near-end speech is dominated by an echo and the output of the non-linear post-processor is being changed for a non-muted to a muted state.

In accordance with a further aspect, the present invention is directed to a system and method for adjusting an acoustic signal from a muted state to an unmuted state by varying an attenuation factor applied to an acoustic signal by an acoustic processor. This aspect of the invention may be used, for example, for removing the chopiness in the audible signal that would otherwise occur when the end of an echo condition is detected and the output of the non-linear post-processor is being changed from a muted to a non-muted state. According to this aspect of the invention, an acoustic signal is provided to an acoustic processor, and an output waveform is formed from the acoustic processor by adjusting the attenuation factor from the muted state to a first attenuation value associated with the non-muted state. After the attenuation factor is adjusted to the first attenuation value, the output waveform is formed by gradually changing the attenuation factor from the first attenuation value to a second attenuation value. The input waveform is attenuated by a smaller amount when the second attenuation value is applied to the acoustic signal than when the first attenuation value is applied to the acoustic signal. This aspect of the invention may also be used, for example, for removing the chopiness in the audible signal that might otherwise result when a mobile phone is operating in AMPS mode and bursty noise is present.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
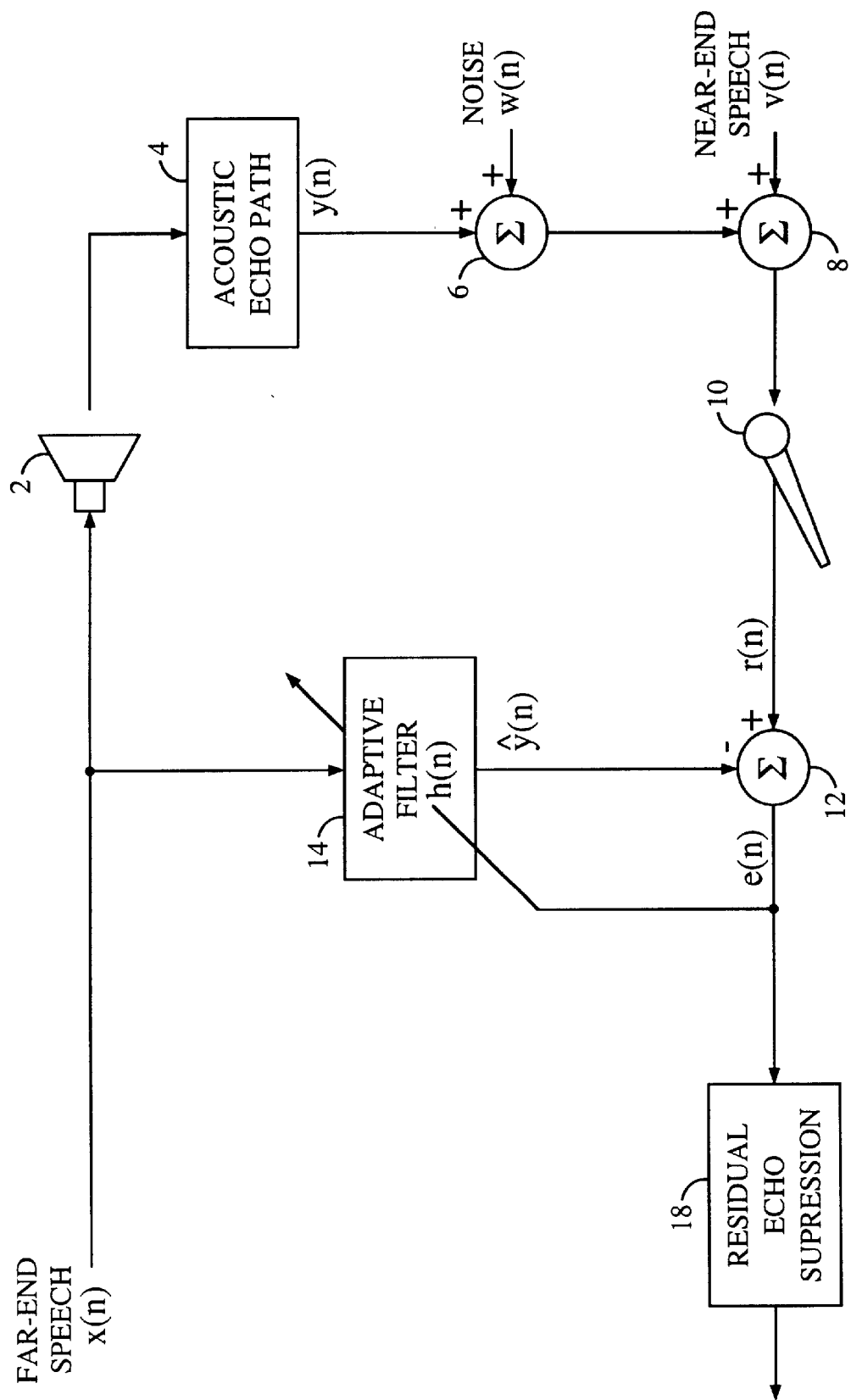
FIG. 1 is a block diagram of a prior art acoustic echo canceller.
Figure 3:
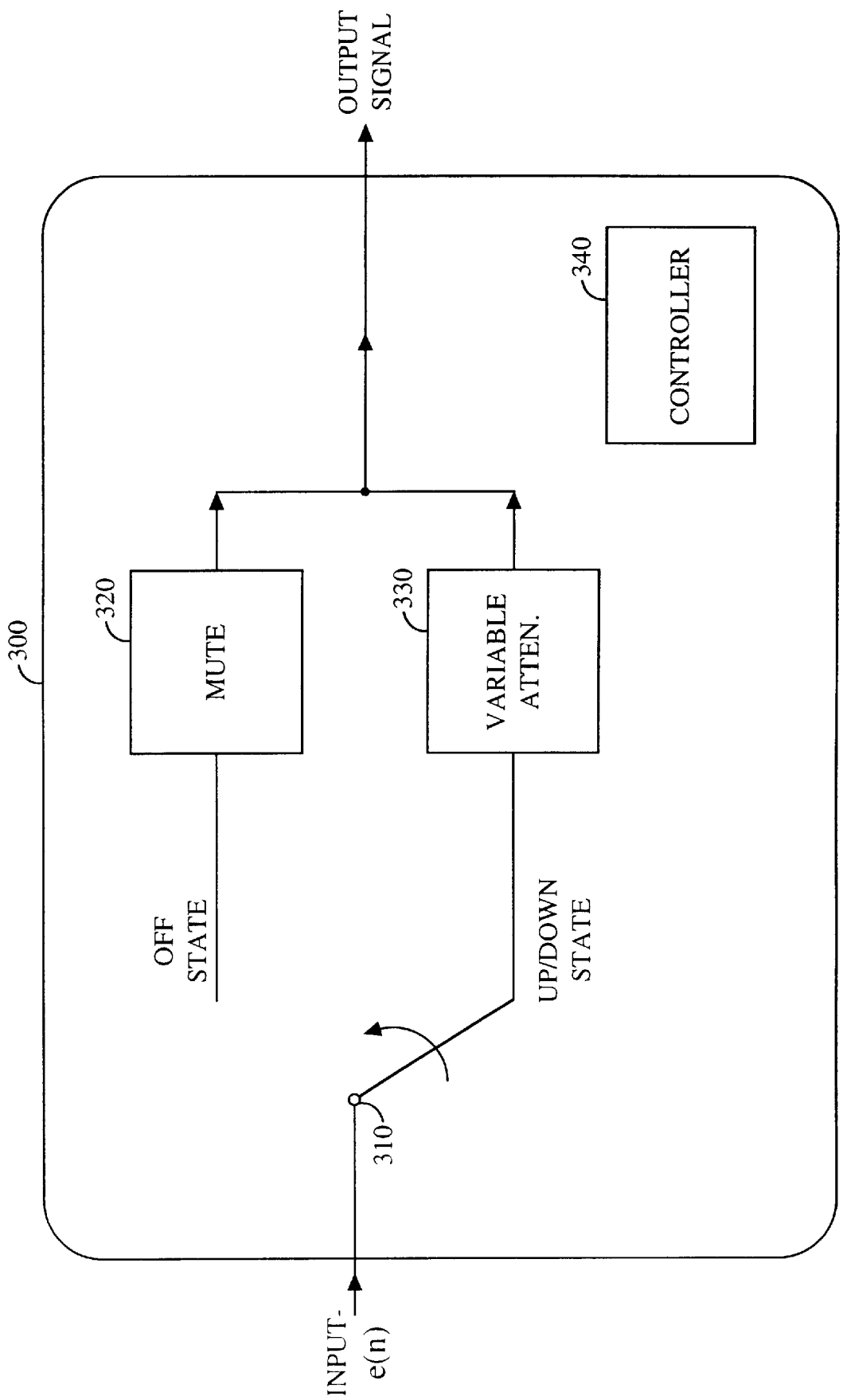
FIG. 3 is a block diagram of a novel non-linear post processor that functions in accordance with a preferred embodiment of the present invention.

Referring now to FIG. 3, there is shown a block diagram of an acoustic processor 300 that functions in accordance with a preferred embodiment of the present invention. Acoustic processor 300 is a non-linear post processor that accepts as its input, for example, the error signal e(n) described above in connection with FIG. 1. Acoustic processor 300 includes a switch 310 for varying the state of the processor between an off state and an up/down state. When acoustic processor 300 is operating in its off state, the input signal e(n) is applied to a muting means 320 which functions to completely gate-off the input signal, thereby producing an output signal at the output of processor 300 that is entirely muted off. When acoustic processor 300 is operating in its up/down state, the input signal e(n) is applied to a variable attentuator 330 which produces an output signal by partially attenuating the input signal. The attenuation factor (k) that is applied to the input signal by the variable attenuator 330 is calculated and adjusted using method 400 shown in FIG. 4. As explained more fully below, the variable attenuator 330 has three states, namely UP, DOWN and OFF. These states are alternatively used depending on whether the variable attenuator is ramping-up the attenuation factor (k) being applied to the input signal (k), ramping-down the attenuation factor (k) that is being applying to the input signal e(n), or off.

Figure 4:
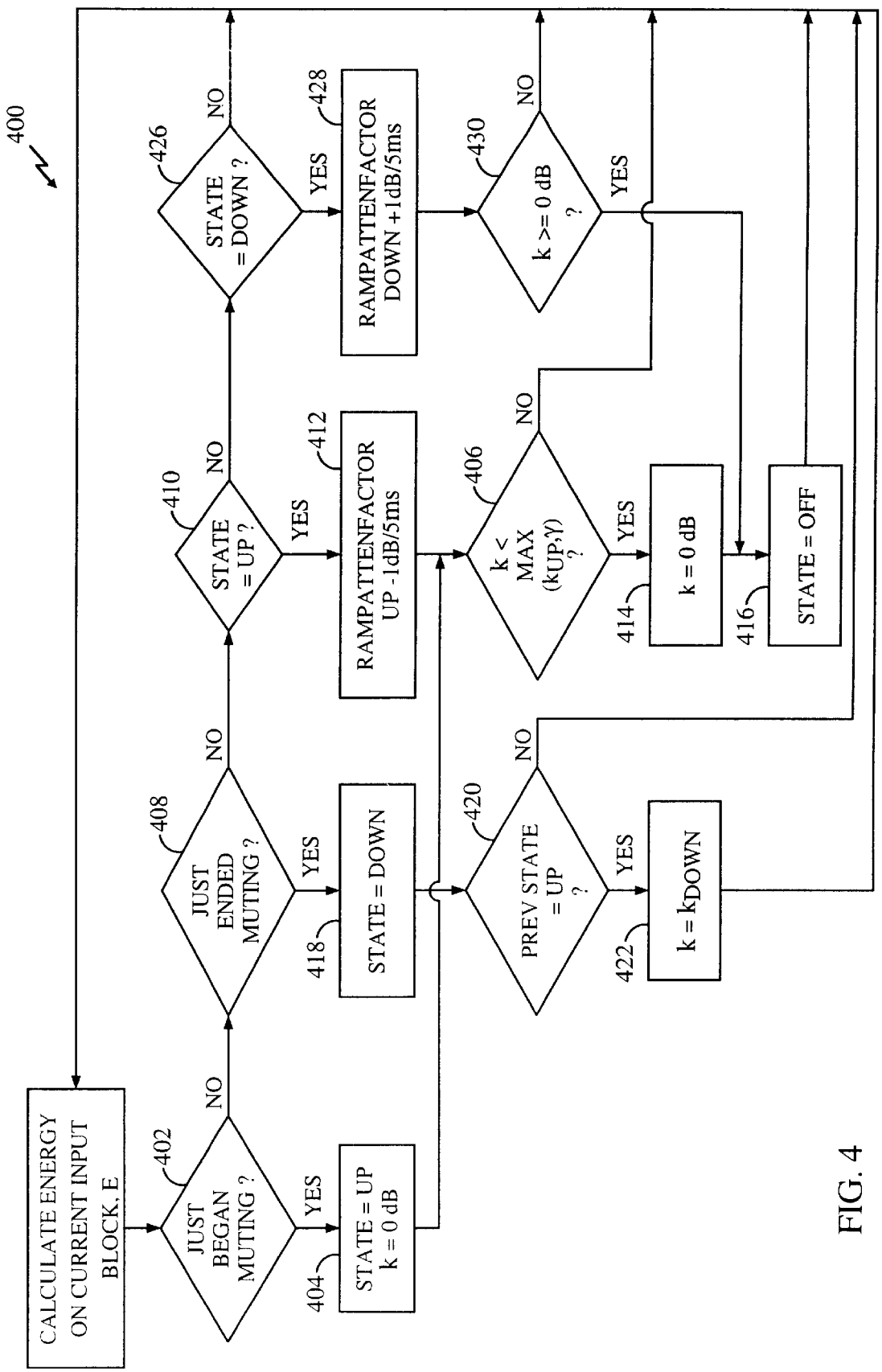
FIG. 4 is a flow diagram showing the method of operation of the nonlinear post processor shown in FIG. 3.

Referring now to FIG. 4, there is shown a flow diagram illustrating a method 400 of operation of the acoustic processor shown in FIG. 3. Method 400 is used to control switch 310 (thereby switching the processor between its off and up/down states) and to vary the attenuation factor (k) applied to the input signal by the variable attenuator 330. Method 400 may be implemented in software using controller 340 in acoustic processor 300. Method 400 is particularly well-suited for controlling an acoustic processor used for processing signals sent between a base station and a mobile telephone using CDMA modulation. The use of CDMA techniques in a multiple access communication system is well known and disclosed, for example, in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

Referring still to FIG. 4, in step 402, the system tests whether processor 300 is about to begin attenuating the input signal e(n). Step 402 will determine that attenuation of the input signal e(n) is about to begin, for example, when an echo condition is first detected by adaptive filter 14, when bursty noise is present at the far-end talker or when an echo condition remains present following the end of a double-talk period. If a determination is made in step 402 that the attenuating of the input signal is about to begin, then processing proceeds to step 404 where the state of processor 300 is set to up/down (i.e., switch 310 directs the input signal to variable attenuator 330), the state of variable attenuator is set to UP, and the current value of the attenuation factor (k) applied to the input signal by attenuator 330 is set to 0 db. Next, in step 406, the current value of the attenuation factor (k) is compared to a threshold $k_{up}$ which is calculated in accordance with equation (1) below:

$$K_{up} = \alpha((M*2^{32}*bnS*G_{pred})/(12*E))^{0.5} \qquad (1)$$

where E represents an energy estimate of the input waveform e(n) over M samples, bnS is a background noise scale value associated with the uniformly distributed random noise generator used for generating w(n), and $G_{pred}$ is the prediction gain of a LPC shaping filter associated with the CDMA modulation used for transmission and reception of the speech signal x(n) between a base station and a mobile station. The constant a is preferably set to 1.0. In alternate embodiments where it is desirable to cause the attenuation of e(n) to ramp-up more quickly, α will preferably be set to a value greater than 1.0. The values bnS and $G_{pred}$ are preferably calculated as set forth in U.S. Pat. No. 5,646,991, entitled "Noise Replacement System in an Echo Canceller," incorporated herein by reference.

If in step 406 it is determined that the current value of the attenuation factor (k) is not less than threshold $k_{up}$, then processing proceeds back to step 402. In cases where a determination was made in the previous iteration of step 402 that the attenuating of the input signal e(n) was about to begin, the current state of variable attenuator 330 will be set to UP, the testing in step 402 will return a NO value and the testing in step 408 (which tests to determine if attenuation of the input signal has just ended) will similarly return a NO value. In such cases, processing thereafter proceeds to step 410 which tests to determine if the current state of the variable attenuator is UP. If the current state of the variable attenuator is UP, then in step 412 the current value of the attenuation factor (k) applied to the input signal is ramped-up. In a preferred embodiment, the attenuation factor is ramped-up an amount equal to −1.5 db/5 msec interval; however, it will be understood by those skilled in the art that the ramp-up amount applied to k in each iteration of step 412 is a matter of design choice and may be greater or less than −1.5 db per step. Next, in step 406, the current value of the attenuation factor (k) is compared to the threshold $k_{up}$. If in step 406 it is determined that the current value of the attenuation factor (k) is not less than threshold $k_{up}$ then the processing loop described above continues to repeat until, as a result of repeated ramping of the value of k in step 412, the current value of the attenuation factor (k) is determined to be less than the threshold $k_{up}$ in step 406.

When the current value of the attenuation factor (k) is determined to be less than the max of the threshold $k_{up}$ or gamma (e.g., gamma=30 dB) in step 406, then in steps 414 and 416, the state of processor 300 is changed from its up/down to its off state (i.e., switch 310 redirects the input signal from variable attenuator 330 to muting means 320), the current value of the attenuation factor (k) is reset to 0, and the state of variable attenuator 330 is set to OFF.

Figure 5:
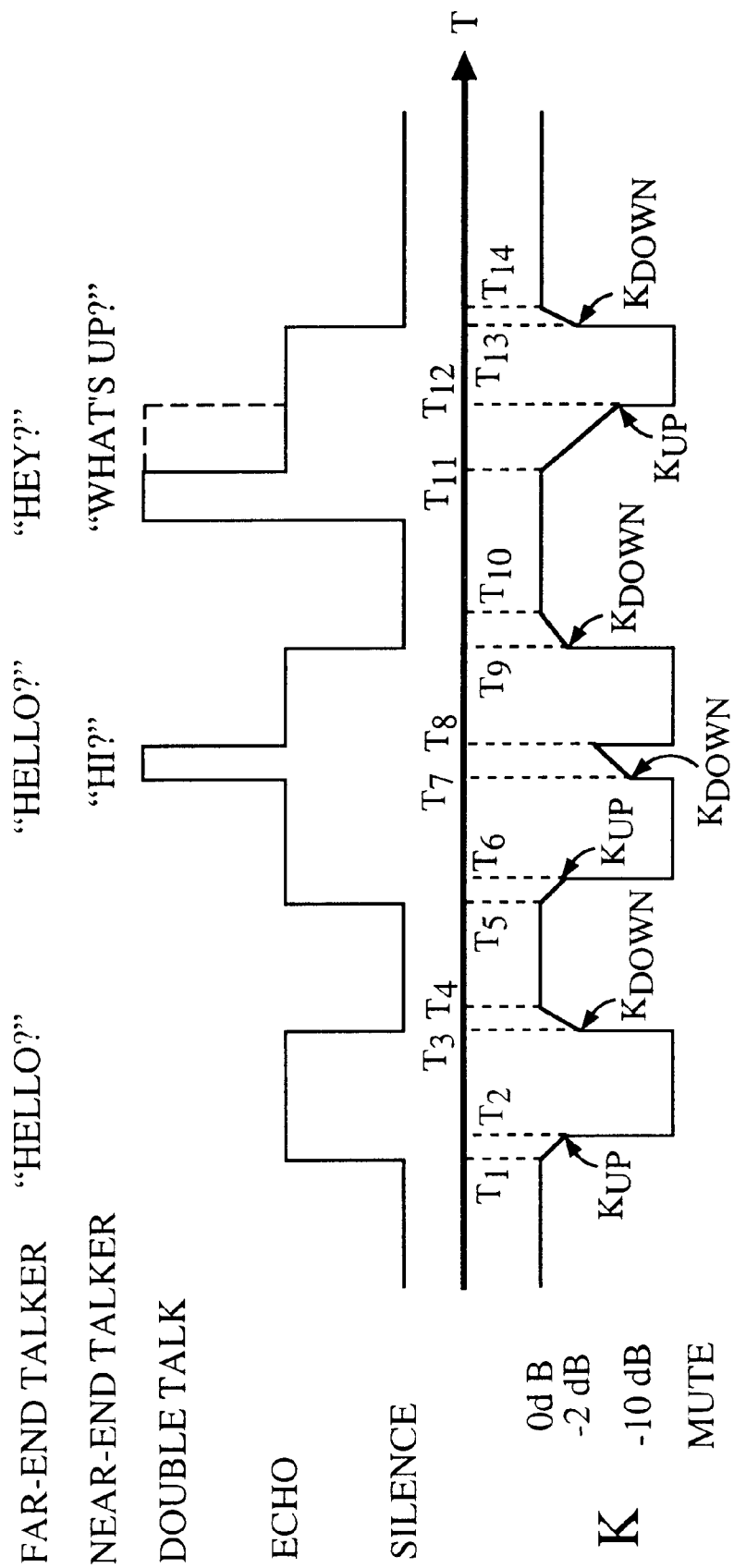
FIG. 5 is a timing diagram showing the operation of the non-linear post-processor shown in FIG. 3 in instances where echo and double-talk conditions are present.

Thus, in cases where the attenuating of the input signal e(n) is initiated because, for example, an echo condition is first detected by adaptive filter 14, bursty noise is present at the far-end talker or an echo condition remains present following the end of a double-talk period, the attenuation is ramped-up gradually (in a step-wise manner at −1.5 db/5 msec interval) until the current value of the attenuation factor reaches $k_{up}$, at which point the input signal is entirely muted. An example of this aspect of the invention is illustrated in FIG. 5 which shows the gradual ramping-up of the attenuation factor (k) starting at $t_1$ when an echo condition first begins. The gradual ramping-up of the attenuation factor (k) continues from $t_1$ until $t_2$, when the value of the attenuation factor (k) reaches $k_{up}$. Immediately following $t_2$, the variable attenuator 330 is turned off and the input signal is entirely muted (i.e., gated-off). By gradually ramping-up the attenuation factor (k) prior to gating-off the input signal at $t_2$, the present invention substantially reduces the "chopiness" in the audible signal that is typically heard by users of prior art echo cancellers. The gradual ramping-up of the attenuation factor (k) when an echo condition first begins is also shown as occuring from $t_5$ to $t_6$ in FIG. 5.

Figure 2:
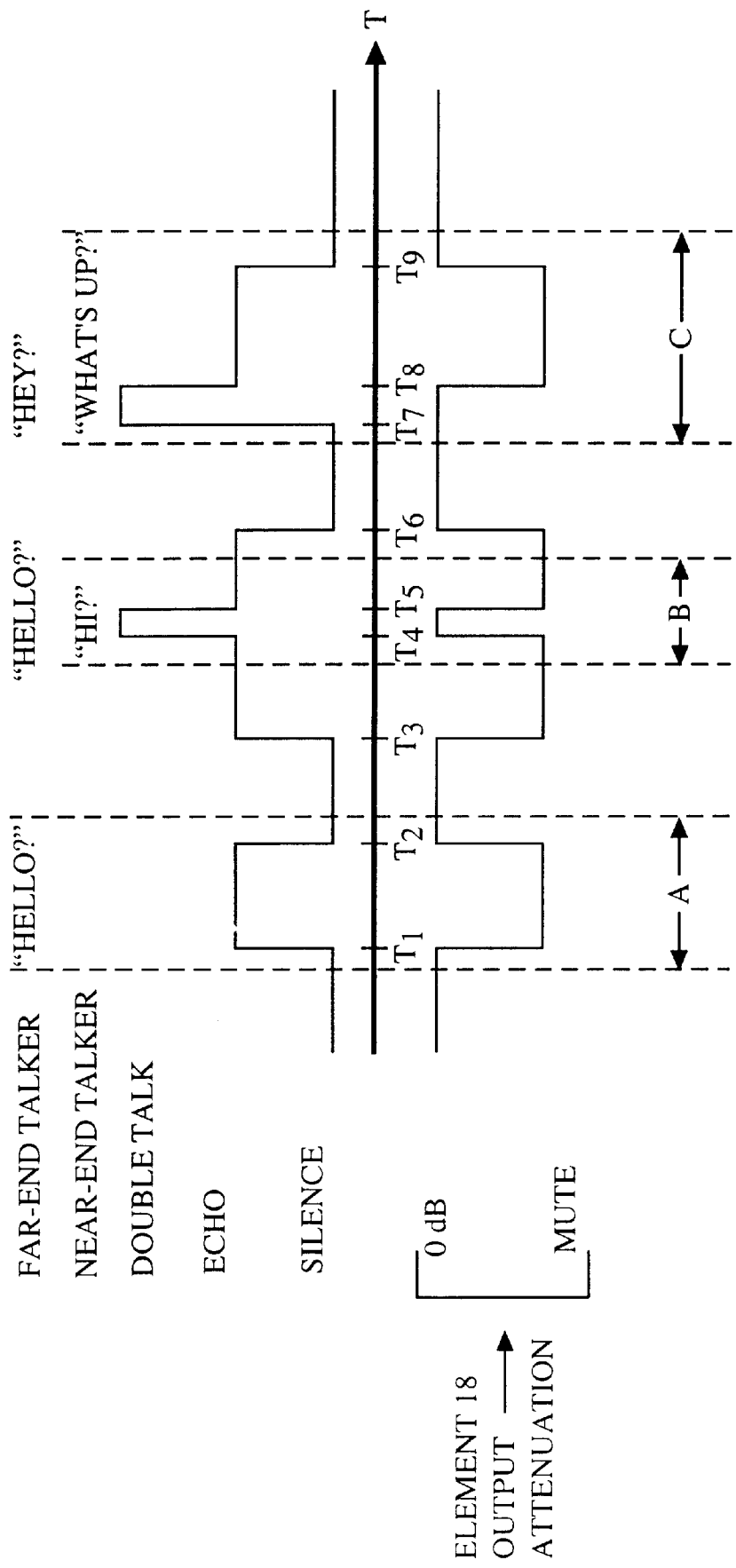
FIG. 2 is a timing diagram showing the operation of the prior art residual echo supression element shown in FIG. 1.

In FIG. 5 there is also shown an example of the operation of the present invention in a case where an echo condition remains present following the end of a double-talk period. In particular, at $t_{11}$ the double-talk condition resulting from simultaneous uttering of "HEY" (by the far-end talker) and the beginning of the phrase "WHAT'S UP" by the near-end talker, ceases to exist. However, at this same time, an echo condition remains as a result of, for example, acoustic coupling of speaker 2 and microphone 10. Gradual ramping-up of the attenuation factor (k) starts at $t_{11}$ when the double-talk period ends and the echo condition remains present. The gradual ramping-up of the attenuation factor (k) continues from $t_{11}$ until $t_{12}$, when the value of the attenuation factor (k) reaches $k_{up}$. Immediately following $t_{12}$, the variable attenuator 330 is turned off and the input signal is entirely muted (i.e., gated-off). Significantly by gradually ramping-up the attentuation prior to gating-off the input signal at $t_{12}$, the present invention permits the portion of the phrase "WHAT'S UP" (from the near-end talker) remaining after cessation of the double-talk period to be transmitted through processor 300, albeit in a partially attenuated form. This result stands in contrast to that achieved by prior art residual echo suppression element 18 (shown in FIG. 2) which, in the identical situation, would entirely gate-off the input signal following cessation of the double-talk period (cessation of the double-talk period occurs at $t_8$ in FIG. 2) thereby precluding any portion of the phrase "WHAT'S UP" (from the near-end talker) remaining after cessation of the double-talk period to be transmitted through to the far-end talker. In addition, by gradually ramping-up the attentuation factor (k) prior to gating-off the input signal at $t_{12}$, the present invention substantially reduces the "chopiness" in the audible signal that is typically heard by users of prior art echo cancellers.

Referring again to FIG. 4, in step 408, the system tests whether processor 300 is about to cease muting the input signal e(n). Step 408 will determine that the attenuation of the input signal e(n) is about to cease, for example, when adaptive filter 14 determines that a previously detected echo condition is no longer present, when previous bursty noise at the far-end talker ceases to be present or when a double-talk period begins during the existence of an echo condition. If a determination is made in step 408 that the attenuating of the input signal is about to cease, then processing proceeds to step 418 where the state of the variable attenuator is changed to DOWN. In step 420, the system tests to determine if the previous state of the variable attenuator 330 was UP. If so, processing proceeds to step 422 where the state of processor 300 is set to up/down (i.e., switch 310 directs the input signal to variable attenuator 330), and the current value of the attenuation factor (k) applied to the input signal by attenuator 330 is set to $k_{down}$, where $k_{down}$ is calculated in accordance with equation (2) below:

$$k_{down}=B((M*2^{32}*bnS*G_{pred})/(12*E))^{0.5} \quad (2)$$

where E represents an energy estimate of the input waveform over M samples, bnS is a background noise scale value for the uniformly distributed random noise generator used for generating w(n), and $G_{pred}$ is the prediction gain of a LPC shaping filter associated with the CDMA modulation used for transmission and reception of the speech signal x(n) between a base station and a mobile station. The constant B is preferably set to 1.0. In alternate embodiments where it is desirable to cause the attenuation of e(n) to ramp-down more quickly, B will preferably be set to a value greater than 1.0.

Next, processing proceeds back to step 402. In cases where a determination was made in the previous iteration of step 408 that the attenuating of the input signal e(n) was about to cease, the current state of variable attenuator 330 will be set to DOWN, the testing in step 402 will return a NO value and the testing in step 408 will similarly return a NO value. In such cases, processing thereafter proceeds to step 426 which tests to determine if the current state of the variable attenuator is DOWN. If the current state of the variable attenuator is DOWN, then in step 428 the current value of the attenuation factor (k) applied to the input signal is ramped-down. In a preferred embodiment, the attenuation factor is ramped-down an amount equal to 1.5 dB/5 msec interval; however, it will be understood by those skilled in the art that the ramp-down amount applied to k in each iteration of step 428 is a matter of design choice and may be greater or less than 1.5 db per step. Next, in step 430, the current value of the attenuation factor (k) is compared to 0 db. If in step 430 it is determined that the current value of the attenuation factor (k) is less than 0 db, then the processing loop described above continues to repeat until, as a result of repeated ramping of the value of k in step 428, the current value of the attenuation factor (k) is determined to be greater than or equal to 0 db in step 430. When the current value of the attenuation factor (k) is determined to be greater than or equal to 0 db in step 430, then in step 416 the state of variable attenuator 330 is set to OFF.

Thus, in cases where the attenuating of the input signal e(n) is terminated because, for example, adaptive filter 14 determines that a previously detected echo condition is no longer present, bursty noise that was previously present at the far-end source ceases to be present or a double-talk period begins during the existence of an echo condition, the attenuation factor is initally set to $k_{down}$. Thereafter, the attenuation factor is ramped-down gradually (in a step-wise manner at 1.0 dB/5 msec interval) until the current value of the attenuation factor reaches 0 dB. An example of this aspect of the invention is illustrated in FIG. 5 which shows the setting of the attenuation factor to $k_{down}$ at $t_3$ when an echo condition first ceases and thereafter the gradual ramping-down of the attenuation factor (k) until $t_4$ when the attenuation factor (k) reaches 0 db. By gradually ramping-down the attenuation factor until reaching 0 db at $t_4$, the present invention substantially reduces the "chopiness" in the audible signal that is typically heard by users of prior art echo cancellers. Examples where, upon cessation of an echo condition, the attenuation factor (k) is intially set to $k_{down}$ and then gradually ramped-down until it reaches 0 db are also shown as occuring from $t_9$ to $t_{10}$ and from $t_{13}$ to $t_{14}$ in FIG. 5.

In FIG. 5 there is also shown an example of the operation of the present invention in a case where a double-talk period begins during the existence of an echo condition. In particular, at $t_7$ a double-talk condition begins as a result of the phase "HI" being spoken by the near-end talker while the phrase "HELLO" is being spoken by the far-end talker. However, immeidately preceeding $t_7$ an echo condition already existed as a result of the uttering of the beginning of the phrase "HELLO" by the far-end talker. When the double-talk period first begins during an echo at $t_7$, the attenuation factor (k) is initally set to $k_{down}$ and then gradually ramped-down until the double-talk period ceases at $t_8$. At $t_8$, a double-talk period has ended and an echo condition remains present. Normally, as explained above, when an echo condition remains present following a double-talk period gradual ramping-up of the attenuation factor (k) until it reaches $k_{up}$ begins. However, since at $t_8$ the attenuation factor (k) is already less than $k_{up}$, the input signal is simply muted-off at $t_8$.

At the beginning and ends of words, voice segments are typically of low energy but still important for understanding. The smooth transition between states in the present invention allows otherwise unvoiced segments to get through, albeit in an attenuated fashion making the speech more understandable.

Figure 6:
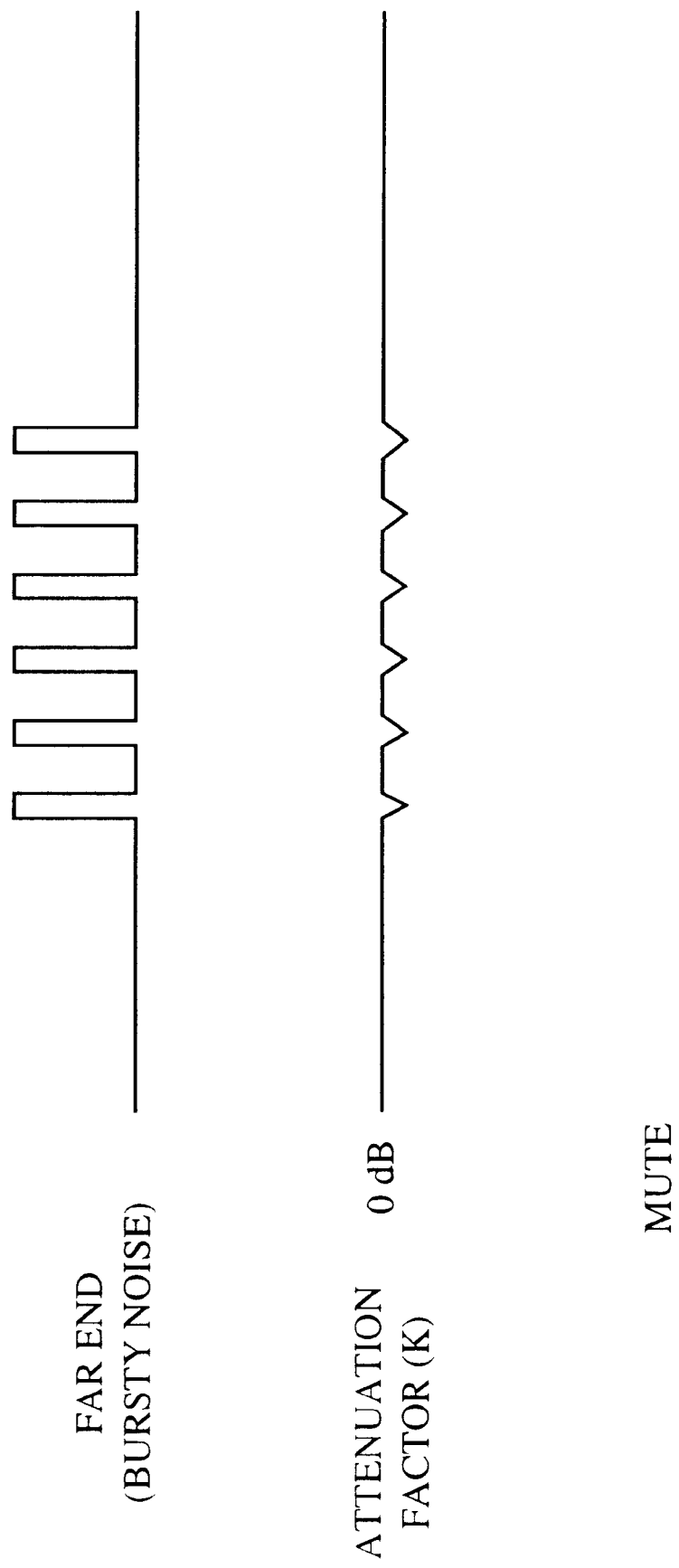
FIG. 6 is a timing diagram showing the operation of the non-linear post-processor of FIG. 3 when bursty noise is present at the far-end talker.

Referring now to FIG. 6, there is shown an example of the operation of the present invention in a case where bursty noise is present at the far-end talker. As shown in FIG. 6, each time a short segment of bursty noise appears at the far-end talker, a condition that is analagous to the echo conditions described above occurs. Thus, at the beginning of each bursty noise segment, the attenuation factor (k) begins ramping-up. However, since each bursty-noise segment is relatively short, the bursty-noise segment ends before the system reaches $k_{up}$. At the end of each bursty noise segment, the attenuation factor begins ramping-down until it reaches 0 db. Unlike the ramping-down that typically occurs at the end of an echo condition, the ramping-down that occurs at the end of a bursty noise segment does not begin at $k_{down}$ because, due to the brevity of each bursty noise segment, the attenuation factor (k) usually does not reach $k_{down}$ during the ramping-up that occurs during the bursty noise segment. This gradual ramping-up and down of the attenuation factor during bursty noise segments stands in contrast to the operation at achieved by prior art residual echo suppression element 18 which, in the identical situation, would entirely gate-off the input signal during each bursty noise segment. By gradually ramping-up and down the attentuation factor (k) for each bursty-noise segment (rather than entirely gating-off the input signal during each such segment), the present invention substantially reduces the "chopiness" in the audible signal that is typically heard by users of prior art echo cancellers.

Although the preferred embodiments of the present invention have been described above in connection with mobile telephones that use CDMA modulation, it will be understood by those skilled in the art that the present invention may be used for implementing an echo canceller in a mobile telephone system that uses alternative modulation techniques such as, for example, time-division multiple-access modulation systems. Moreover, it will be understood by those skilled in the art that the present invention may be used to improve echo cancellation in acoustic systems other than mobile telephone systems, and that the teachings of the present invention may be used in non-acoustic echo cancellers such as those used in network applications.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method of canceling an echo signal, comprising the steps of:

(A) providing an input waveform to an acoustic processor;

(B) determining whether said input waveform includes information representative of said echo signal; and (C) forming an output waveform by attenuating a residual waveform with said acoustic processor if said input waveform includes information representative of said echo signal, wherein forming the output waveform comprises:
calculating an attenuation threshold as a function of an energy estimate of the input waveform over a predetermined number of samples, a background noise value, and a prediction gain for a filter;
comparing the attenuation threshold to said attenuation factor; and
adjusting the attenuation factor in response,
wherein said residual waveform is attenuated by an attenuation factor that gradually changes from an initial attenuation value to a final attenuation value during said attenuating.

2. The method of claim 1, wherein said attenuation factor decreases linearly from said initial attenuation value to said final attenuation value during said attenuation step.

3. The method of claim 2, further comprising the step of:
(D) after said residual waveform is attenuated by said final attenuation amount during said attenuation step, muting said output waveform.

4. The method of claim 3, wherein said initial attenuation value is equal to 0 db.

5. The method of claim 3, wherein said attenuation factor is decreased from said initial attenuation value to said final attenuation value in equal stepwise increments during said attenuation step.

6. The method of claim 5, wherein said attenuation factor is decreased from said initial attenuation value to said final attenuation value at a rate of 1 db every 5 ms during said attenuation step.

7. The method of claim 1, wherein said attenuation threshold ($K_{up}$) is calculated in accordance with the following equation:

$$K_{up}=\alpha((M*2^{32}*bnS*G)/(12*E))^{0.5}$$

wherein E represents an energy estimate of said input waveform over M samples, bnS is a background noise scale value for a uniformly distributed random noise generator, and Gpred is the predication gain of a LPC shaping filter associated with CDMA modulation.

8. The method of claim 1, wherein said echo signal is representative of an acoustic echo resulting from coupling of a microphone and a speaker located at a position associated with a far-end talker.

9. The method of claim 1, wherein said echo signal corresponds to bursty noise supplied into a transmission channel at a position associated with a far-end talker.

10. A method for adjusting an acoustic signal from a muted state to an unmuted state by varying an attenuation factor applied to an acoustic signal by an acoustic processor, comprising the steps of:
(A) providing said acoustic signal to an acoustic processor;
(B) forming an output waveform from said processor by adjusting said attenuation factor from the muted state to a first attenuation value associated with said unmuted state; and
(C) after said attenuation factor is adjusted to said first attenuation value in step (B), forming said output waveform by gradually changing said attenuation factor from said first attenuation value to a second attenuation value, wherein forming the output waveform comprises:
calculating an attenuation threshold as a function of an energy estimate of the input waveform over a predetermined number of samples, a background noise value, and a prediction gain for a filter;
comparing the attenuation threshold to said attenuation factor; and
adjusting the attenuation factor in response;
wherein said input waveform is attenuated by a smaller amount when said second attenuation value is applied to said acoustic signal than when said first attenuation value is applied to said acoustic signal.

11. The method of claim 10, wherein said attenuation factor is increased from said first attenuation value to said second attenuation value in equal stepwise increments during step (C).

12. The method of claim 11, wherein said attenuation factor is increased from said first attenuation value to said second attenuation value at a rate of 1 db every 5 ms during said step (C).

13. A method of claim 10 wherein said attenuation threshold is equal to 0 db.

14. The method of claim 12, wherein said second attenuation value ($K_{down}$) is calculated in accordance with the following equation:

$$K_{down}=B((M*2^{32}*bnS*G_{pred})/(12*E))^{0.5}$$

wherein E represents an energy estimate of said input waveform over M samples, bnS is a background noise scale value for a uniformly distributed random noise generator, and $G_{pred}$ is the prediction gain of a LPC shaping filter associated with said CDMA modulation.

15. The method of claim 10, wherein said echo signal is representative of an acoustic blip occurring at a position associated with a near-end talker.

16. A system for canceling an echo signal in a code-division-multiple-access modulated signal, comprising:
an acoustic processor that receives an input waveform;
an adaptive filter that determines whether said input waveform includes information representative of said echo signal; and
said acoustic processor including a variable attenuator that forms an output waveform by attenuating a residual waveform if said input waveform includes information representative of said echo signal;
wherein said variable attenuator attenuates said residual waveform by an attenuation factor that gradually changes from an initial attenuation value to a final attenuation value if said input waveform includes information representative of said echo signal,
wherein said acoustic processor forms an output waveform by:
calculating an attenuation threshold as a function of an energy estimate of the input waveform over a predetermined number of samples, a background noise value, and a prediction gain for a filter;
comparing the attenuation threshold to said attenuation factor; and adjusting the attenuation factor in response.

17. A system for adjusting an acoustic signal from a muted state to an unmated state by varying an attenuation factor applied to an acoustic signal by an acoustic processor, comprising:
an acoustic processor that receives an acoustic signal;
said acoustic processor including a variable attenuator that forms an output waveform by first adjusting said attenuation factor from the muted state to a first attenuation value associated with said non-muted state and, after said attenuation factor is adjusted to said first attenuation value, forming said output waveform by gradually changing said attenuation factor from said first attenuation value to a second attenuation value;
wherein said acoustic processor calculates an attenuation threshold, compares the attenuation threshold to said attenuation factor, and adjusts the attenuation factor in response;
wherein the attenuation threshold is a function of an energy estimate of the input waveform over a predetermined number of samples, a background noise value, and a prediction gain for a filter;
wherein said input waveform is attenuated by a smaller amount when said second attenuation value is applied to said acoustic signal than when said first attenuation value is applied to said acoustic signal.

18. An apparatus for canceling an echo signal, comprising:

means for providing an input waveform to an acoustic processor;

means for determining whether said input waveform includes information representative of said echo signal; and means for forming an output waveform by attenuating a residual waveform with said acoustic processor if said input waveform includes information representative of said echo signal, wherein forming the output waveform comprises:

calculating an attenuation threshold as a function of an energy estimate of the input waveform over a predetermined number of samples, a background noise value, and a prediction gain for a filter;

comparing the attenuation threshold to said attenuation factor; and adjusting the attenuation factor in response,
wherein said residual waveform is attenuated by an attenuation factor that gradually changes from an initial attenuation value to a final attenuation value during said attenuating.

* * * * *